US008306670B2

(12) United States Patent
Oda (10) Patent No.: US 8,306,670 B2
(45) Date of Patent: Nov. 6, 2012

(54) PROTECTION AND CONTROL SYSTEM

(75) Inventor: Shigeto Oda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 636 days.

(21) Appl. No.: 12/480,876

(22) Filed: Jun. 9, 2009

(65) Prior Publication Data

US 2010/0060017 A1   Mar. 11, 2010

(30) Foreign Application Priority Data

Sep. 9, 2008   (JP) ................................. 2008-231279

(51) Int. Cl.
*G06F 1/28* (2006.01)
*H02H 3/05* (2006.01)
(52) U.S. Cl. .............. 700/292; 700/4; 700/82; 700/295; 375/356; 709/221; 714/14; 714/22; 714/4.11; 714/4.12; 714/6.31; 714/1; 714/2; 714/11; 714/13; 714/41
(58) Field of Classification Search .................... 700/58, 700/292, 4; 709/221; 714/14, 22, 1, 2, 4.11, 714/4.12, 6.31, 11, 13, 41
See application file for complete search history.

(56) References Cited

U.S. PATENT DOCUMENTS

| | | | | |
|---|---|---|---|---|
| 6,418,539 B1 * | 7/2002 | Walker | ............................ | 714/5.1 |
| 6,591,150 B1 * | 7/2003 | Shirota | ............................ | 700/82 |
| 6,662,281 B2 * | 12/2003 | Ballard et al. | ................ | 711/162 |
| 6,742,136 B2 * | 5/2004 | Christensen et al. | ........ | 714/5.11 |
| 6,845,301 B2 | 1/2005 | Hamamatsu et al. | | |
| 7,945,773 B2 * | 5/2011 | Barabash et al. | ............. | 713/100 |
| 2004/0255186 A1 * | 12/2004 | Lau | .................................... | 714/6 |
| 2007/0168058 A1 * | 7/2007 | Kephart et al. | .................. | 700/82 |
| 2007/0174686 A1 * | 7/2007 | Douglas et al. | ................. | 714/13 |
| 2008/0183406 A1 * | 7/2008 | Lee et al. | ......................... | 702/58 |
| 2008/0244044 A1 * | 10/2008 | Wimmer | ....................... | 709/221 |

FOREIGN PATENT DOCUMENTS

| | | |
|---|---|---|
| EP | 1 976 177 | 10/2008 |
| JP | 2002-315233 A | 10/2002 |
| JP | 2007-116897 A | 5/2007 |

OTHER PUBLICATIONS

Baigent et al, "IEC 61850 Communication Networks and Systems in Substations: An Overview for Users", Nov. 10, 2004, SISCO, pp. 36.*
Apostolov et al, "Impact of IEC 61850 on Power System Protection", Oct. 29, 2006, IEEE, pp. 1053-1058.*

(Continued)

*Primary Examiner* — John R. Cottingham
*Assistant Examiner* — Olvin Lopez Alvarez
(74) *Attorney, Agent, or Firm* — Buchanan Ingersoll & Rooney PC (57) ABSTRACT

A system for protecting, controlling, and monitoring substation devices of a power system, includes a spare protection and control unit that, when there is a failure in a protection and control unit from among protection and control units that perform a protection and control operation for the substation devices, downloads unit information including software and a device setting value of failed protection and control unit from a database unit and functions as an alternative unit for the failed protection and control unit.

3 Claims, 5 Drawing Sheets

OTHER PUBLICATIONS

Zhang et al, "A new Style CEntralized IED based on IEC 61850", Jul. 20, 2008, IEEE, pp. 1-5.*

Lee et al, Fault tolerant Technology to increase Reliability for IEC 61850 based Subsattion Automation System, 2006, CIGRE.org, pp. 9.*

Rim et al, "Multi-agent based reliability Enhancement Scheme for IEC61850 Substation", Apr. 2008, IEEE, pp. 1-6.*

Combined Search and Examination Report issued in corresponding United Kingdom Application No. 0909823.7 dated Oct. 6, 2009.

* cited by examiner

PROTECTION AND CONTROL SYSTEM

BACKGROUND OF THE INVENTION

1. Field of the Invention

The present invention relates to a system for protecting, controlling, and monitoring a power system.

2. Description of the Related Art

In an electric power plant such as a substation, a protection and control system is provided that includes a protective relaying function for protecting substation devices constituting a power system and a monitor control function for monitoring the substation devices. In a substation-device protection and control system disclosed in Japanese Patent Application Laid-open No. 2007-116897, a merging unit that converts analog signals of voltage and current of the power system as well as device data of circuit breakers, line switches, etc., into serial digital data, is incorporated in a substation device or is provided near the substation device. The merging unit is connected to a protection and control unit via a process bus, so that data is transmitted between the merging unit and the protection and control unit as serial digital data. Thus, cost for electric cables needed for transmitting analog signals can be reduced, thereby reducing the cost for the protection and control system.

Japanese Patent Application Laid-open No. 2007-116897 discloses following two system configurations for the substation device protection and control system to cope with a failure in the protection and control unit. In the first system configuration, two units of hardware are provided, each having a protective function as well as a control function. Each of the units is in charge of one of the functions, and when one of the units fails, the other one performs the both functions. In the second configuration, an integrated protection and control unit that can perform the protection function as well as the control function is employed in dual units, so that when one unit fails, the other unit performs the both functions.

In other words, the conventional protection and control system essentially requires hardware comparable to a dual-unit configuration to instantly cope with a failure of the protection and control unit. Consequently, in the conventional protection and control system, cost increase is inevitable for enhancing reliability of the protection and control unit.

SUMMARY OF THE INVENTION

It is an object of the present invention to at least partially solve the problems in the conventional technology.

According to one aspect of the present invention, there is provided a system for protecting, controlling, and monitoring substation devices of a power system. The system includes a plurality of protection and control units that is connected to a first bus and a second bus and performs a protection and control operation for the substation devices; a database unit that is connected to the second bus and stores therein unit information that includes software and a device setting value for each of the protection and control units; and a spare protection and control unit that is connected to the first bus and the second bus, and when there is a failure in a protection and control unit from among the protection and control units, downloads the unit information of failed protection and control unit from the database unit via the second bus and functions as an alternative unit for the failed protection and control unit. The first bus is for transmitting analog signals and device data from the substation devices as serial data, and the second bus is for transmitting protection and control data of the substation devices as serial data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to the embodiments explained here.

Figure 1:
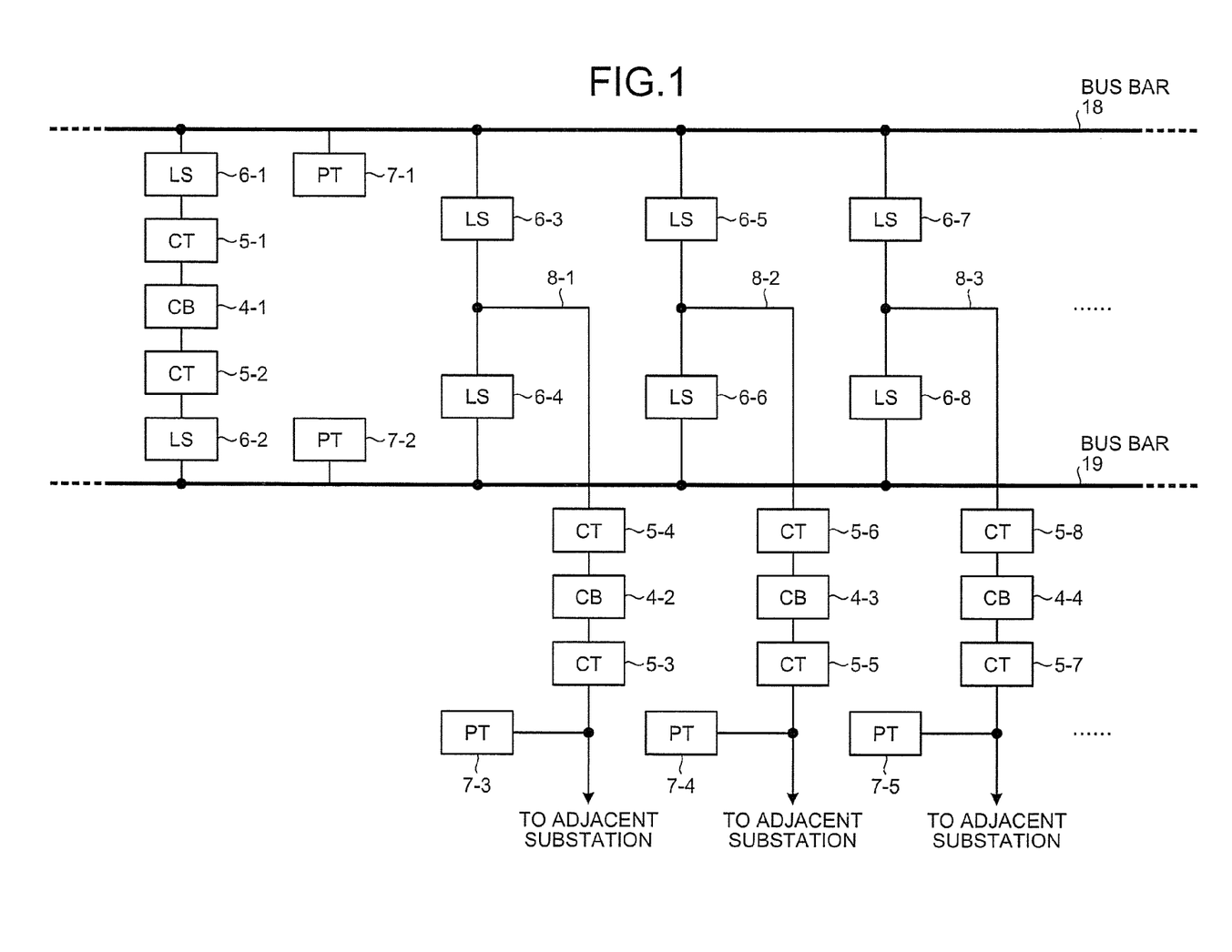
FIG. 1 is a schematic diagram of substation devices connected to a main circuit installation in a substation according to a first embodiment of the present invention.

FIG. 1 is a schematic diagram of substation devices connected to a main circuit equipment in a substation according to a first embodiment of the present invention. In the example shown in FIG. 1, circuit breakers (CBs), line switches (LSs), current transformers (CTs), and potential (voltage) transformers (PTs) are connected to double bus bars. FIG. 1 is explained using one phase of a three-phase alternating current.

As shown in FIG. 1, there are two bus bars 18 and 19 with a tie line connecting them. A CB 4-1, CTs 5-1 and 5-2 on either side of the CB 4-1, and LSs 6-1 and 6-2 on the side of the bus bars 18 and 19, respectively, are connected to the tie line. PTs 7-1 and 7-2 are connected to the bus bars 18 and 19, respectively.

A line 8-1 drawn from both the bus bars 18 and 19 is connected to an adjacent substation (not shown) via LSs 6-3 and 6-4. A CB 4-2, CTs 5-3 and 5-4 on either side of the CB 4-2, and a PT 7-3 are connected to the line 8-1. Similarly, LSs 6-5 and 6-6, a CB 4-3, CTs 5-5 and 5-6, and a PT 7-4 are connected to a line 8-2 drawn from both the bus bars 18 and 19. Likewise, LSs 6-7 and 6-8, a CB 4-4, CTs 5-7 and 5-8, and a PT 7-5 are connected to a line 8-3 drawn from both the bus bars 18 and 19. Although not shown, LSs, CBs, CTs, and PTs are connected to every line in a similar manner.

Figure 2:
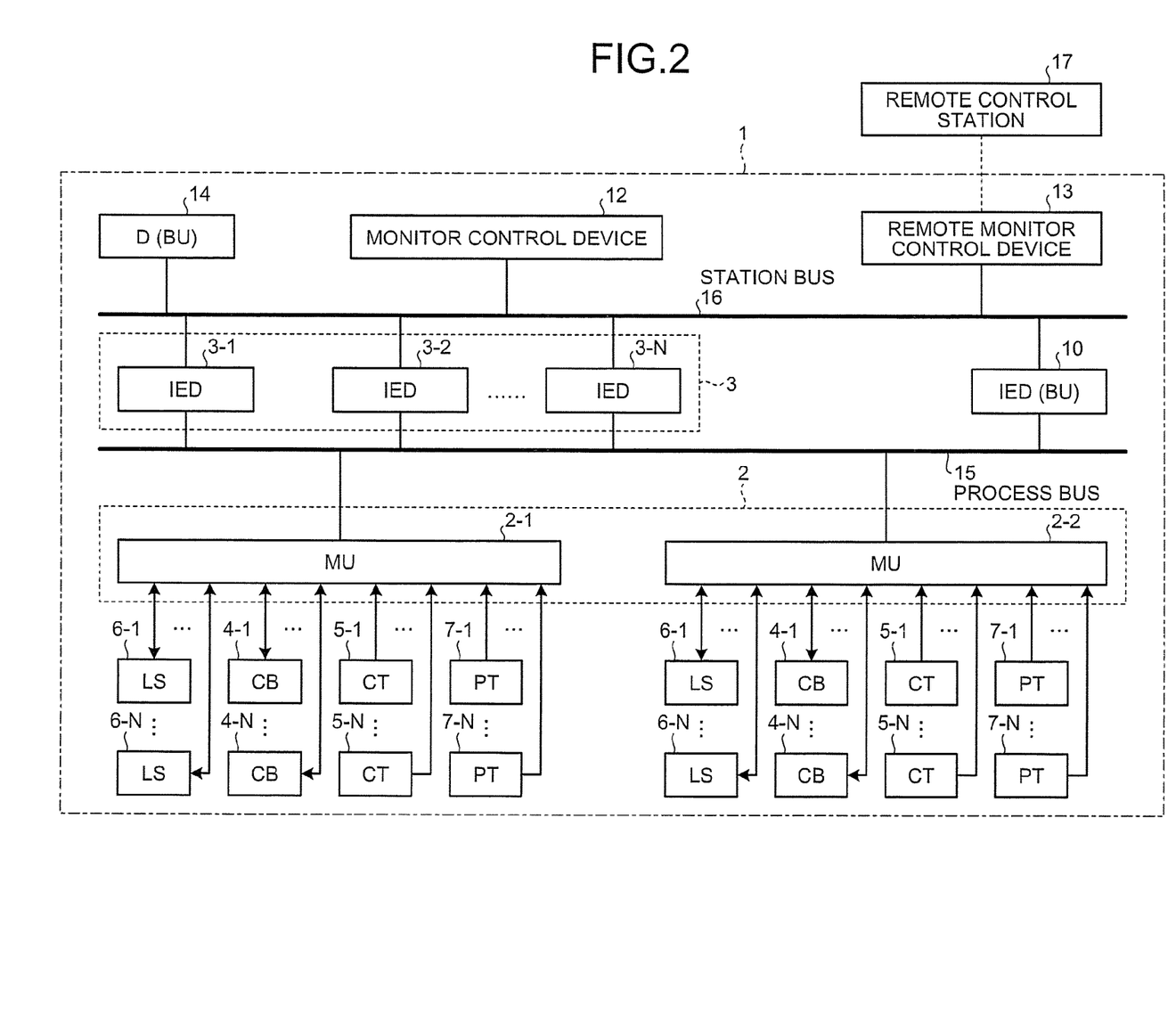
FIG. 2 is a schematic diagram of a structure of a protection and control system according to the first embodiment of the present invention.

FIG. 2 is a schematic diagram of a structure of a protection and control system 1 according to the first embodiment of the present invention. The protection and control system 1 includes the CBs 4-1 to 4-N, the LSs 6-1 to 6-N, the CTs 5-1 to 5-N, the PTs 7-1 to 7-N, a plurality of merging units (MUs) 2-1 and 2-2, a plurality of intelligent electronic devices (IEDs) 3-1 to 3-N, each forming a protection and control unit, an IED backup unit (IED (BU)) 10 that forms a spare protection and control unit, a monitor control device 12, a remote monitor control device 13, and a data base unit (D (BU)) 14. The MUs 2-1 and 2-2 are connected to the IEDs 3-1 to 3-N and the IED (BU) 10 with a process bus 15 as a first bus for the IEDs 3-1 to 3-N and the IED (BU) 10 transmitting data required for protection, control, and monitoring of the substation devices. The IEDs 3-1 to 3-N and the IED (BU) 10 are connected to the monitor control device 12, the remote monitor control device 13, and the D (BU) 14 with a station bus 16 as a second bus for data transmission between the IEDs 3-1 to 3-N and the IED (BU) 10 or for the monitor control device 12 and the remote monitor control device 13 transmitting substation-device protection and control data that includes control commands to the IEDs 3-1 to 3-N and the IED (BU) 10.

The MU 2 retrieves analog signals of voltage and current of the bus bars 18 and 19 as well as each of the lines 8-1 to 8-N, and device data of the CBs 4-1 to 4-N, the LSs 6-1 to 6-N, etc., converts them into digital data, and sends the digital data as serial data to the IEDs 3-1 to 3-N via the process bus 15. In FIG. 2, the MU 2 is configured with two units of the MUs 2-1 and 2-2 as an example. However, the MU 2 can be configured with one unit according to a required reliability of the system. Alternatively, the MU 2 can be configured with more than two MUs according to the processing capability of the MU.

From the serial data sent via the process bus 15, each of the IEDs 3-1 to 3-N retrieves data required by itself, and performs a protection and control operation. Based on an operation result, each of the IEDs 3-1 to 3-N controls the CBs 4-1 to 4-N, the LSs 6-1 to 6-N, etc., via the process bus 15 and the MUs 2-1 and 2-2, or sends the operation result as serial data to the monitor control device 12 and the remote monitor control device 13 via the station bus 16. The operation performed by the IED (BU) 10 is explained later.

The monitor control device 12 performs monitor control of the entire substation based on the operation result of each of the IEDs 3-1 to 3-N that is sent via the station bus 16. The remote monitor control device 13 sends monitor control data of the entire substation to a remote control station 17.

The IED (BU) 10 and the D (BU) 14 are explained next with reference to FIG. 2.

The IED (BU) 10 is configured to be equivalent to the IED, among the IEDs 3-1 to 3-N of the protection and control system 1, that is capable of performing an operation of maximum capacity, so that any of the IEDs 3-1 to 3-N can be replaced by the IED (BU) 10.

The D (BU) 14 stores therein unit information that includes software and current device setting values for the IEDs 3-1 to 3-N of the protection and control system 1.

When any of the IEDs 3-1 to 3-N fails, the IED (BU) 10 downloads and installs the unit information of the failed IED from the D (BU) 14 via the station bus 16. Thus, the IED (BU) 10 is able to accomplish the function of the failed IED (by becoming an alternative unit), and quickly starts an alternative operation on behalf of the failed IED. The IEDs 3-1 to 3-N can perform self-diagnosis for detecting failure, and if any abnormality is detected, sends a failure signal to the IED (BU) 10 via the station bus 16. The self-diagnosis or the failure signal transmission may not be possible if there is a complete breakdown of an IED. In such a case, the IED (BU) 10 can periodically check the soundness of each of the IEDs 3-1 to 3-N.

Figure 3:
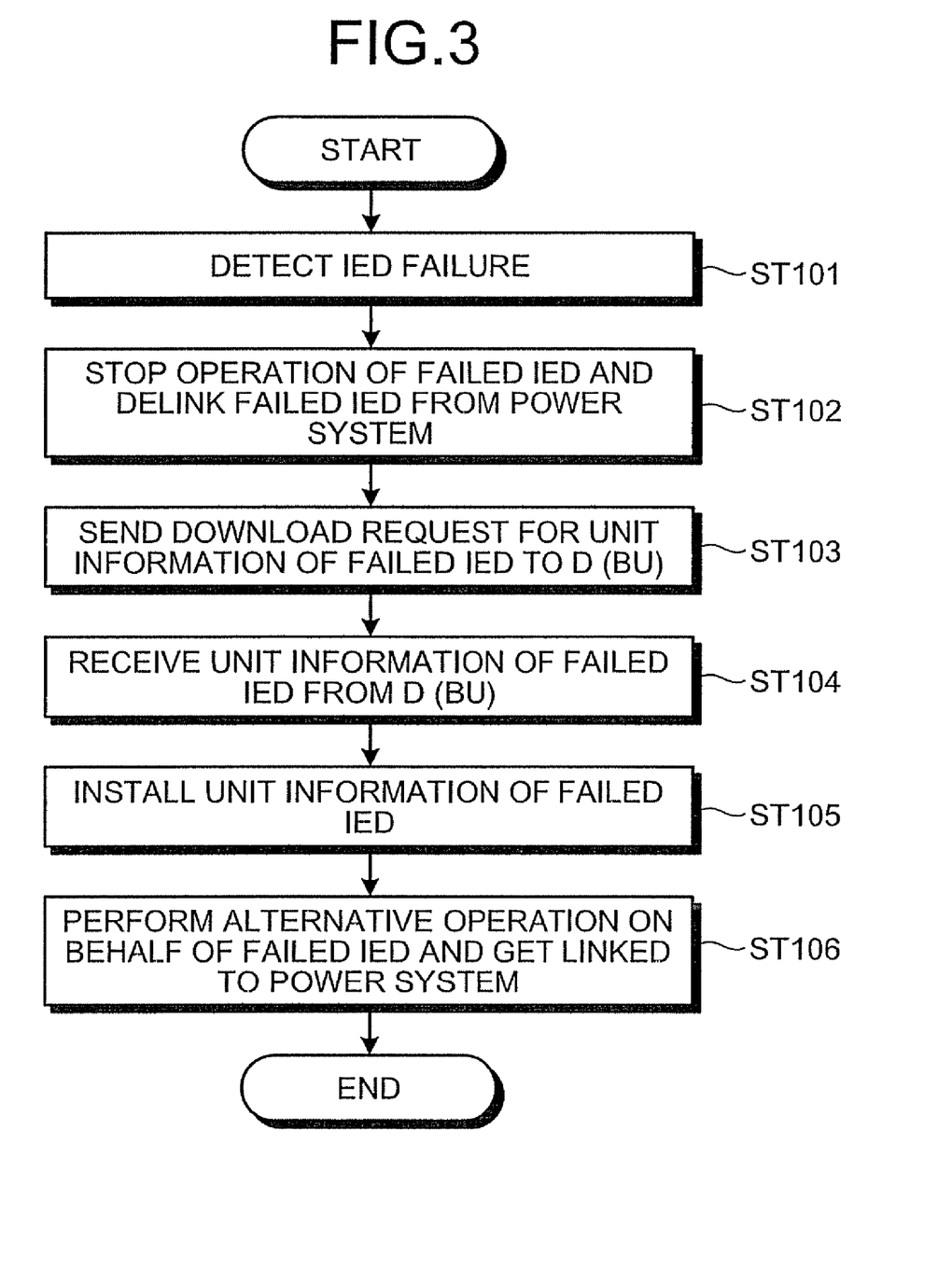
FIG. 3 is a flowchart of an alternative process performed by an intelligent electronic device (backup unit) (IED (BU)) of the protection and control system shown in FIG. 2.

A detailed procedure performed by the IED (BU) 10 until the start of the alternative operation thereof is explained with reference to FIGS. 2 and 3. FIG. 3 is a flowchart of an alternative process performed by the IED (BU) 10 of the protection and control system according to the first embodiment.

When any of the IEDs fails (Step ST101), the IED (BU) 10 stops the operation of the failed IED, delinks the failed IED from the power system (Step ST102), and issues a download request to the D (BU) 14 for the unit information about the failed IED via the station bus 16 (Step ST103). Upon receiving the download request, the D (BU) 14 sends to the IED (BU) 10 the unit information about the failed IED via the station bus 16 (Step ST104).

The IED (BU) 10 installs the downloaded unit information and thus becomes the alternative unit (Step ST105), and starts the alternative operation on behalf of the failed IED and gets linked to the power system (Step ST106).

Failure detection of the IED can be performed by self-detection by the IEDs 3-1 to 3-N, or by the IED (BU) 10 performing a periodic checking for the soundness of the IEDs 3-1 to 3-N, or by mutual checking of the IEDs 3-1 to 3-N. For transmission of the unit information about the failed IED, failure detection can be sent to the IED (BU) 10 upon which the IED (BU) 10 can issue a download request to the D (BU) 14, as described earlier, or the failure detection can be sent to the D (BU) 14, which can then send the unit information about the failed IED to the IED (BU) 10. Although not shown, a separate failure detection unit can be provided that detects a failure of the IED and controls the D (BU) 14 and the IED (BU) 10.

Thus, in the protection and control system 1 according to the first embodiment, one unit each of the IED (BU) 10, which is a spare protection and control unit capable of performing an alternative operation for all of the IEDs 3-1 to 3-N connected to the process bus 15, and the D (BU) 14, which is a database unit that stores therein the unit information including the software and the current device setting values for all the IEDs 3-1 to 3-N, are provided. When any of the IEDs fails, the IED (BU) 10 downloads the unit information about the failed IED from the D (BU) 14 via the station bus 16, and performs the alternative operation on behalf of the failed IED. Consequently, cost for the IED can be prevented from increasing, protection and control function of a plurality of IEDs can be backed up and a failure in any IED can be immediately addressed, and a degree of reliability can be achieved that is comparable to a dual-unit configuration.

In the first embodiment, when any of the IEDs fails, the spare protection and control unit IED (BU) downloads the unit information about the failed IED from the D (BU) and performs the alternative operation on behalf of the failed IED. In a second embodiment according to the present invention, in addition to the structure according to the first embodiment, an IED (substation backup unit) (IED (SSBU)) is provided that serves as a backup protection unit having, out of all the functions that all the IEDs have, a backup protection function. When there is a failure in an IED, the IED (SSBU) performs a backup protection until the time the IED (BU) starts the alternative operation on behalf of the failed IED.

Figure 4:
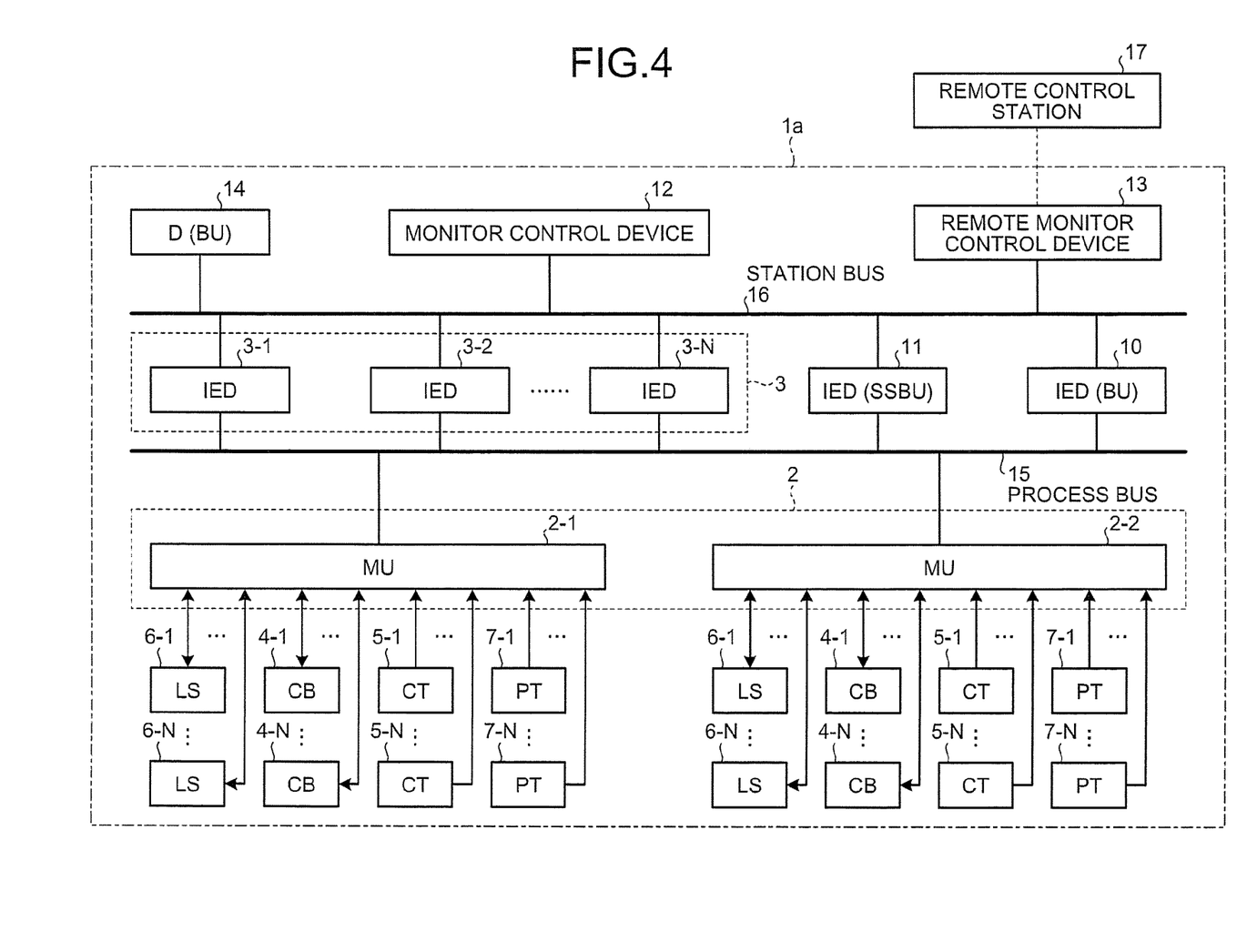
FIG. 4 is a schematic diagram of a structure of a protection and control system according to a second embodiment of the present invention.

FIG. 4 is a schematic diagram of a structure of a protection and control system 1a according to the second embodiment of the present invention. The protection and control system 1a has the same structure as that according to the first embodiment, and additionally, includes an IED (SSBU) 11 that has a backup protection function of all the IEDs 3-1 to 3-N.

The IED (SSBU) 11 stores therein the software and device setting values for all the IEDs 3-1 to 3-N of the protection and control system 1a required for the backup protection and is in operation at all times. When any IED fails and its function stops, causing malfunction in the substation before the IED (BU) 10 starts the operation, the IED (SSBU) 11 can perform the backup protection of the failed IED and delink the failed electric line. Thus, even when there is an IED failure, the substation devices remain protected.

Figure 5:
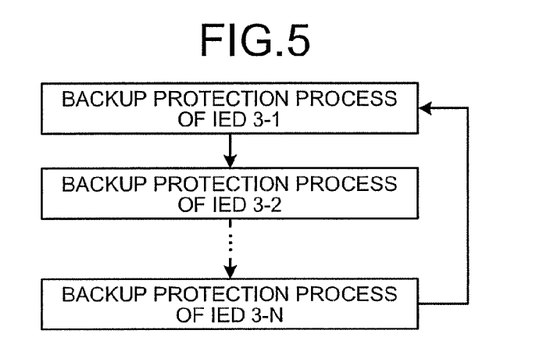
FIG. 5 is a schematic diagram illustrating process transitions of a backup protection function performed by an IED (substation backup unit) (IED (SSBU)) shown in FIG. 4.

FIG. 5 is a flowchart of the process transitions of the backup protection function performed by the IED (SSBU) 11. For example, the IED (SSBU) 11 performs a backup protection process sequentially for the IEDs 3-1 to 3-N, and thereafter repeats the backup protection process beginning with the IED 3-1. The term "backup protection" refers to a protection function that comes into operation when a main protection fails in fast delinking of an electric line for some reasons in a case of ground fault, phase fault, or the like in the substation. The backup protection process requires a smaller operation capability as compared with a main protection process. Therefore, the backup protection of all the IEDs 3-1 to 3-N is performed by implementation of a time division process such that one round of the backup protection process is completed on all the IEDs 3-1 to 3-N within a designated period required for the backup protection.

Thus, in the protection and control system according to the second embodiment, the IED (SSBU) 11 that has, out of all the functions that all the IEDs have, the backup protection function, and that is in operation at all times, completes one round of the backup protection process on all the IEDs within the designated period required for the backup protection. Consequently, in addition to the effect due to the first embodiment, improved protection reliability is achieved because the backup protection is performed even in the unprotected period between the time an IED fails and the time the IED (BU) 10 starts the alternative operation.

In the second embodiment, an IED (SSBU) is provided that has a backup protection function for the functions of all the IEDs, that is in operation at all times, and that performs the backup protection for each of the IEDs by a time division process. However, the IED (SSBU) performs the backup protection for each of the IEDs by a time division process. Therefore, depending on which IED fails, there may be a small time difference between the time an IED fails and the time the IED (SSBU) performs the backup protection for the failed IED. Therefore, in a third embodiment of the present invention, the IED (SSBU) is configured to be in a standby mode at all times, and when there is a failure in an IED, instantly start the backup protection of the failed IED.

Figure 6:
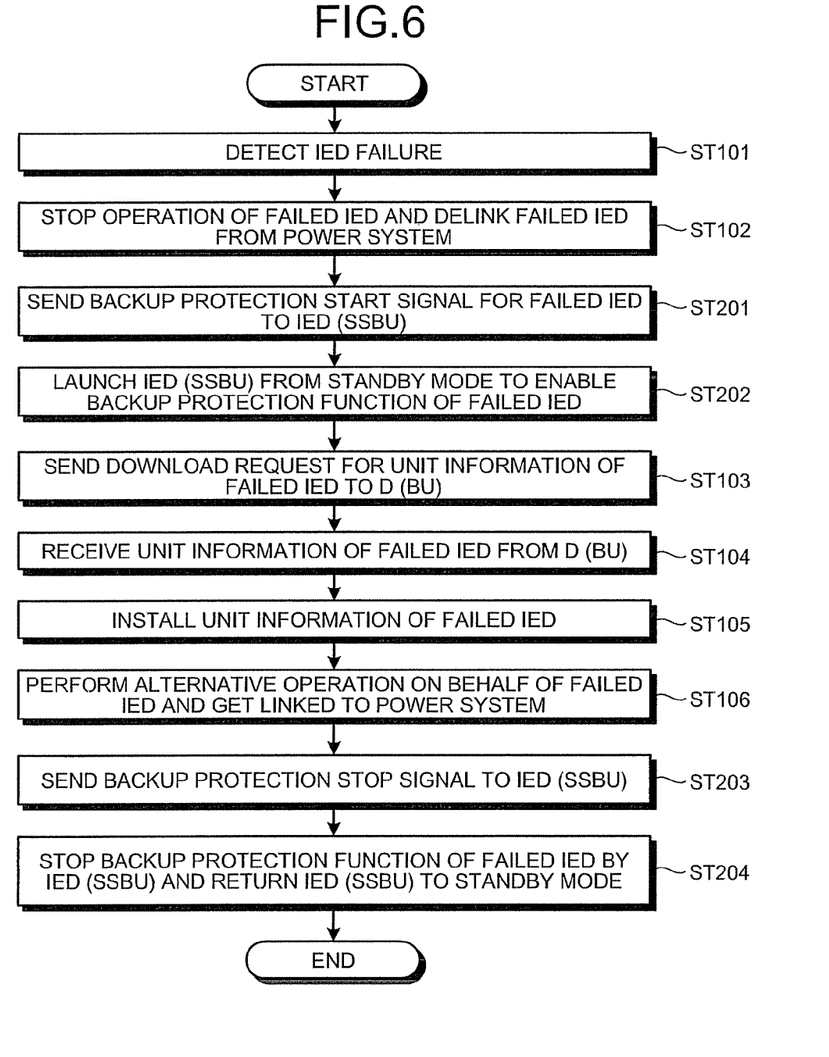
FIG. 6 is a flowchart of an alternative process performed by the IED (BU) and a process of the backup protection function performed by an IED (SSBU) of a protection and control system according to a third embodiment of the present invention.

The structure of a protection and control system according to the third embodiment of the present invention is the same as that of the second embodiment. FIG. 6 is a flowchart of the alternative process performed by the IED (BU) and a process of the backup protection function performed by the IED (SSBU) of the protection and control system according to the third embodiment. Steps ST101 to ST106 are the same as those described in the first embodiment. The process of the backup protection function performed by the IED (SSBU) 11 (Steps ST201 to ST204) is interspersed between Steps ST101 to ST106.

When any of the IEDs fails (Step ST101), the IED (BU) 10 stops the operation of the failed IED, delinks the failed IED from the power system (Step ST102), and sends to the IED (SSBU) 11 via the station bus 16, a backup protection start signal for the failed IED (Step ST201). In response, the IED (SSBU) 11 instantly launches from the standby mode, and enables the backup protection function of the failed IED (Step ST202).

Once the IED (BU) 10 starts the alternative operation on behalf of the failed IED and gets linked to the power system (Step ST106), the IED (BU) 10 sends to the IED (SSBU) 11 via the station bus 16, a backup protection stop signal (Step ST203). In response, the IED (BU) 10 stops the backup protection function of the failed IED, and returns to the standby mode (Step ST204). Thus, the IED (SSBU) 11 performs the backup protection of the failed IED from the time the operation of the failed IED is stopped and the failed IED is delinked from the power system (Step ST102) up to the time the IED (BU) 10 starts the alternative operation on behalf of the failed IED and gets linked to the power system (Step ST106).

Thus, in the protection and control system according to the third embodiment, the IED (SSBU) 11 having, out of all functions that all the IEDs have, the backup protection function is kept in a standby mode, so that the IED (SSBU) 11 is launched to start the backup protection of the failed IED instantly after receiving the backup protection start signal. Consequently, the unprotected period from the time an IED fails until the time the IED (SSBU) 11 starts the backup protection can be shortened.

In the embodiments described here, one unit each of the IED (BU) and the IED (SSBU) are provided. However, a plurality of different types of IEDs (BU) and IEDs (SSBU) of different processing capabilities can be provided if each of the IEDs has a different processing capability.

The IED in the embodiments is explained as a protection and control unit having both the protection function and the control function. However, the protection function and the control function can be provided separately to different units.

In the second embodiment, instead of performing the backup protection by the time division process, the IED (SSBU) can perform the backup protection of all the IEDs at all times if the IED (SSBU) has a processing capability for simultaneously performing the backup protection for all the IEDs. In this case, the protection reliability can be further enhanced because the IED (SSBU) can perform the backup protection of a failed IED at the same instant when a failure occurs in the IED.

The protection and control system according to the embodiments is adapted for the protection and control of the bus bars of a power system substation. However, the protection and control system can be adapted for the protection and control of electric cabling of a distribution substation.

According to one aspect of the present invention, cost for the protection and control unit can be prevented from increasing, protection and control function of a plurality of IEDs can be backed up, a failure in any IED can be immediately addressed, and a degree of reliability can be achieved that is comparable to the IED of a dual-unit configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for protecting, controlling, and monitoring substation devices of a power system, the system comprising:
   a plurality of protection and control units that are connected to a first bus and a second bus and perform a protection and control operation for the substation devices;
   a database unit that is connected to the second bus and stores therein unit information that includes software and a device setting value for each of the protection and control units;
   a spare protection and control unit that is connected to the first bus and the second bus, and when there is a failure in a protection and control unit from among the protection and control units, downloads the unit information of failed protection and control unit from the database unit via the second bus and functions as an alternative unit for the failed protection and control unit; and a backup protection unit that is connected to the first bus and the second bus and includes a backup protection function, wherein the first bus is for transmitting digital data, which is converted from analog signals and device data from the substation devices, as serial data, the second bus is for transmitting protection and control data of the substation devices as serial data, and the backup protection unit enables the backup protection function for each of the protection and control units at least until the spare protection and control unit starts functioning as the alternative unit.

2. The system according to claim 1, wherein the backup protection unit enables the backup protection function for the protection and control units by a time division manner.

3. A system for protecting, controlling, and monitoring substation devices of a power system, the system comprising:

a plurality of protection and control units that are connected to a first bus and a second bus and perform a protection and control operation for the substation devices;

a database unit that is connected to the second bus and stores therein unit information that includes software and a device setting value for each of the protection and control units;

a spare protection and control unit that is connected to the first bus and the second bus, and when there is a failure in a protection and control unit from among the protection and control units, downloads the unit information of failed protection and control unit from the database unit via the second bus and functions as an alternative unit for the failed protection and control unit; and a backup protection unit that is connected to the first bus and the second bus and performs a backup protection function, wherein the first bus is for transmitting digital data, which is converted from analog signals and device data from the substation devices, as serial data, the second bus is for transmitting protection and control data of the substation devices as serial data, and when there is a failure in a protection and control unit from among the protection and control units, the backup protection unit enables the backup protection function for failed protection and control unit, and upon the spare protection and control unit starting functioning as the alternative unit for the failed protection and control unit, disables the backup protection function.

* * * * *